US005167369A

United States Patent [19]

Kubacek

[11] Patent Number: 5,167,369

[45] **Date of Patent: * Dec. 1, 1992**

[54] ROADSIDE SPRAYING APPARATUS FOR MINIMIZING DRIFT

[76] Inventor: Johnny L. Kubacek, 803 Cantrell, Jourdanton, Tex. 78026

[ * ] Notice: The portion of the term of this patent subsequent to Apr. 16, 2008 has been disclaimed.

[21] Appl. No.: 685,520

[22] Filed: Apr. 15, 1991

Related U.S. Application Data

[63] Continuation-in-part of Ser. No. 393,076, Aug. 9, 1989, which is a continuation-in-part of Ser. No. 722,411, Apr. 10, 1985, Pat. No. 5,007,585.

[51] Int. Cl.[5] .......... B05B 1/20

[52] U.S. Cl. .......... 239/102.1; 239/164; 239/170; 239/172; 239/176

[58] Field of Search .......... 239/102.1, 172, 162, 239/164, 169, 170, 176, 587, 288-288.5, 562

[56] References Cited

U.S. PATENT DOCUMENTS 1,102,354 7/1914 Pougnet .

3,285,516 11/1966 Waldrum .......... 239/102.1

3,369,754 2/1968 Wolford .

3,390,835 7/1968 Harris .......... 239/102.1 X 4,252,274 2/1981 Kubacak .......... 239/170

5,007,585 4/1991 Kubacak .......... 239/176

FOREIGN PATENT DOCUMENTS 535493 7/1930 Fed. Rep. of Germany .......... 239/162

895023 4/1962 United Kingdom .......... 239/172

*Primary Examiner*—Andres Kashnikow

*Attorney, Agent, or Firm*—Donald R. Comuzzi

[57] ABSTRACT

An apparatus for roadside spraying of herbicides or other liquids in a manner which ensures uniform application of the herbicide without resorting to atomization of the sprayed liquid. The apparatus uniformly applies the herbicide in a plurality of swaths at different distances from the spraying apparatus by vibrationally altering the directions of the sprayed liquid streams. Uniform coverage is ensured by allowing the amplitudes of the direction alterations to vary in accordance with the target distance of sprayed liquid stream.

6 Claims, 3 Drawing Sheets

ROADSIDE SPRAYING APPARATUS FOR MINIMIZING DRIFT

CROSS REFERENCE TO RELATED APPLICATION

The present application is a continuation-in-part application of Applicant's co-pending application, Ser. No. 07/393,076, filed Aug. 9, 1989, which is a continuation-in-part application of Applicant's co-pending application, Ser. No. 722,411, filed on Apr. 10, 1985, now U.S. Pat. No. 5,007,585.

BACKGROUND OF THE INVENTION

The present invention relates to an apparatus for spraying of liquids. More particularly, the present invention is directed to a roadside spraying apparatus which minimizes atomization and resulting drift of sprayed herbicides or other liquids, mounted on a detachable frame fixed to a vehicle, and controllable by a vehicle operator by means of a control panel, used to regulate the flow of the liquids as well as the direction in which the liquids are sprayed.

Many state highway departments, counties and cities, have for several years been mechanically cutting undesirable weeds, grass and brush in their right-of-ways. However, while such cutting has been primarily accomplished by hand labor or mechanical means, it can be costly and time consuming. In order to minimize these problems, many publicly funded organizations have attempted to spray their right-of ways with herbicides that would control the undesirable plant growth.

Herbicides used primarily for control of broad leaf weeds and some unwanted grasses are used extensively on the right-of-way, leaving desirable grasses alive for erosion control. These herbicides, such as MSMA and 2-4-D, are termed selective since they do not kill the desirable grasses. Other herbicides used primarily for control of vegetation on shoulders and in the roadway are intended to kill all vegetation and hopefully prevent its regrowth for some period of time. Such herbicides are termed residuals. Other liquids, including fertilizers, may also be advantageously applied along a roadway; however, since application of liquid herbicides is more common, Applicant concentrates this discussion upon the application of herbicides.

Such application almost invariably involves spraying a liquid from an apparatus comprising some type of nozzle. As liquid is sprayed from a moving nozzle, it is generally applied to strip-like areas of ground called swaths. A swath, in this context, also refers to the spray pattern produced by the nozzle and applied to the corresponding strip of ground.

The equipment which has been used in the past for roadside spraying of herbicides has generally been of three common types. Handgun-type sprayers are still commonly used today for lack of anything with more versatility. Another common type of equipment comprises a long boom extending out from the side of the vehicle and across the right-of-way. An example of such a long boom is shown in U.S. Pat. No. 2,995,307, issued to J. J. McMahon. Another has been the use of an off-center nozzle mounted to the side of the truck. The use of the off-center nozzle is discussed further below.

The long-extending boom has been used widely because of its ability to reach 25 to 30 feet into the right-of-way. Some designs have provided the boom in sections to give the operator more flexibility as to where he could spray the herbicide. This has also allowed the operator to save chemicals. That type of unit, however, does not lend itself to many right-of-way applications because of hills, back slops and obstructions in the areas to be sprayed. Common obstructions including trees, bluffs, road signs and the like are a major problem. Furthermore, the extended boom is vulnerable to contact with such obstructions causing extensive down time and delays accompanied by losses in production. It is also very expensive to replace such booms.

SUMMARY OF THE INVENTION

The present invention provides for controlled application of herbicides by a mechanized apparatus mountable to a mobile vehicle. The present invention may incorporate a plurality of straight stream nozzles combined with direction altering means in a manner which optimizes performance of a roadside sprayer. The nozzles are fixed to a spray arm and positioned to direct at the appropriate angles to cover the desired targeted areas. The spray is oscillated to break up the liquid streams into predetermined droplet sizes to achieve uniform spray coverage. The nozzles are mounted upon a spray head which may be remotely operated by a vehicle operator to change the inclination of the direction of spray. While the preferred embodiments described above have been described in the terms of multiple swaths, it is to be understood that all nozzles can be operated in unison from a single solenoid to create a single swath.

The variation of nozzle ranges also enables variation in the number of different swaths applied at any one time as is advantageous in certain applications. That variation is achieved by connecting separate groups of nozzles to separately controllable fluid supplies. Since each group of nozzles produces a different swath, by controlling the separate fluid supplies, a variable pattern of swaths may be produced at any one time.

Additionally, the present invention provides for spraying liquid in aerial streams rather than atomized sprays in order to minimize atomization and drift. By vibrationally altering the direction of the sprayed liquid streams, the present invention scatters the streams thereby avoiding streaked applications and achieving greater uniformity of coverage over a larger area while still minimizing atomization and drift.

The present invention also provides for uniform application of herbicides onto a roadside throughout the course of the application. That feature is enabled in part by mounting each of the nozzles that are vibrated onto a common support which, in turn, is vibrated. That configuration creates vibrational alterations in the direction of the emitted streams which are in phase with each other. Such vibrations create greater uniformity in the spray of herbicides than would otherwise be obtained.

In order to produce a stream which will travel to the distances required by most road spraying applications, a certain minimum size stream is required. That is because a smaller stream will dissipate and fall to the ground before reaching the target. The dissipation occurs due to gravitational force acting on the horizontally traveling stream of water and even a large stream will dissipate upon reaching a certain distance. That natural scatter may be used to advantage since it results in a uniform application of herbicide to the target area even without vibrationally altering the directions of the streams. However, in the third embodiment, all the nozzles are subject to a vibration to create a more uniform spray area.

The natural scatter described above also results in the herbicide being applied over a larger area. In order to equalize the herbicide content to both near and far swaths, it is preferable that near swaths be composed of greater number of streams than the further swaths. It is also preferred that the closer streams have smaller nozzles orifices. This preferred embodiment results in more uniform application of herbicide. That means using nozzles of a smaller size for near swaths than for far swaths. In order to attain even greater uniformity of application, the three embodiments of the present invention use a greater number of small size nozzles for swaths nearest the vehicle. While the preferred embodiment produces the best results, it is also acceptable to maintain the same nozzles size for all swaths and increase the vibration for the closer nozzles to achieve a small droplet size for the closer swaths.

Since aerial streams tend naturally to scatter at greater distances from their respective nozzles, the present invention optimizes uniformity of herbicide application by incorporating means to vary the magnitude of the vibrational alterations in inverse proportion to the aerial distance the stream travels before reaching its target of application. That gradual increase in vibration is incorporated to compensate for the gradual decrease of natural scatter corresponding to decreasing distances which different streams will travel before contacting the roadside. That graduated degree of vibrational alteration is enabled in the three embodiments by pivoting the common vibrating support for the nozzles. Such pivoting provides for diminished vibrations nearer to the pivotal point and larger vibrations at greater distances from the pivot point. The nozzles which are vibrated more can, in turn, be directed at closer ranges where natural scatter is diminished.

These and other advantages of the present invention will become evident to those skilled in the art upon a reading of the following detailed description of the three embodiments taken in conjunction with the accompanying drawings and claims.

BRIEF DESCRIPTIONS OF THE DRAWINGS

DETAILED DESCRIPTION OF THE PREFERRED EMBODIMENT

Figure 1:
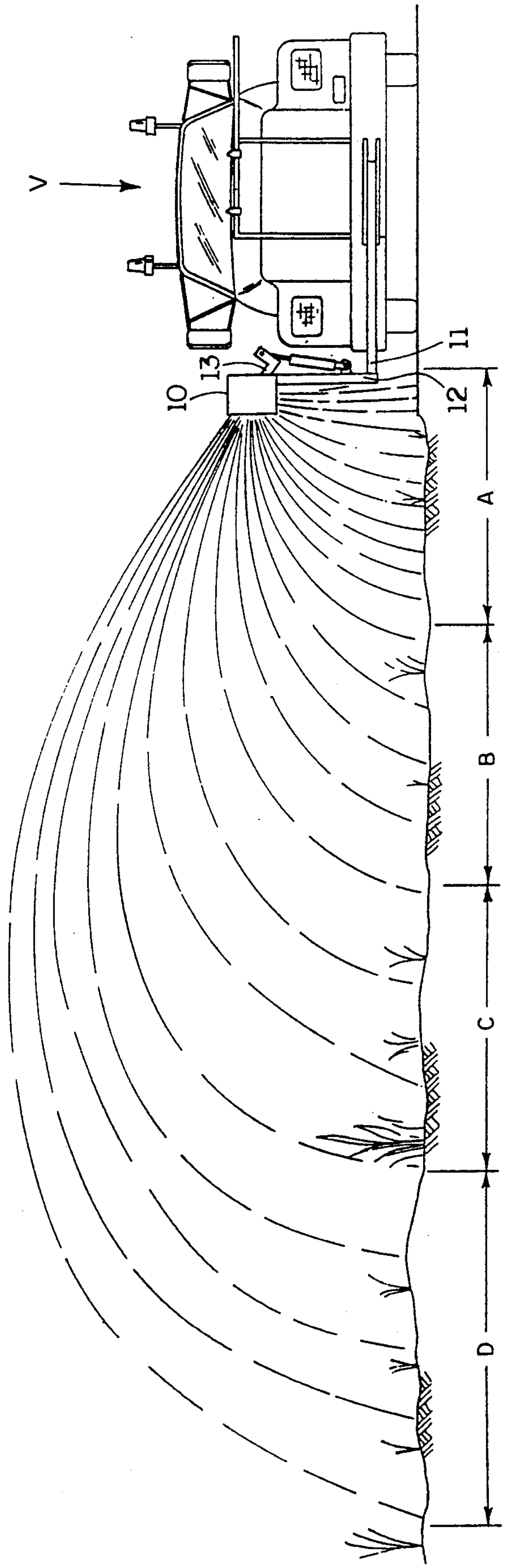
FIG. 1 shows the spraying apparatus of the invention mounted on a vehicle showing the laterally adjacent swaths corresponding to different sets of the nozzles.

The spraying apparatus of FIG. 1 is adapted to be used upon a motor vehicle in connection with liquid supply means and pumping means. U.S. Pat. No. 4,315,602 discloses liquid supply means and pumping means as tanks and pumps which may be used in connection with this invention. The disclosure of that patent is incorporated herein.

Figure 2:
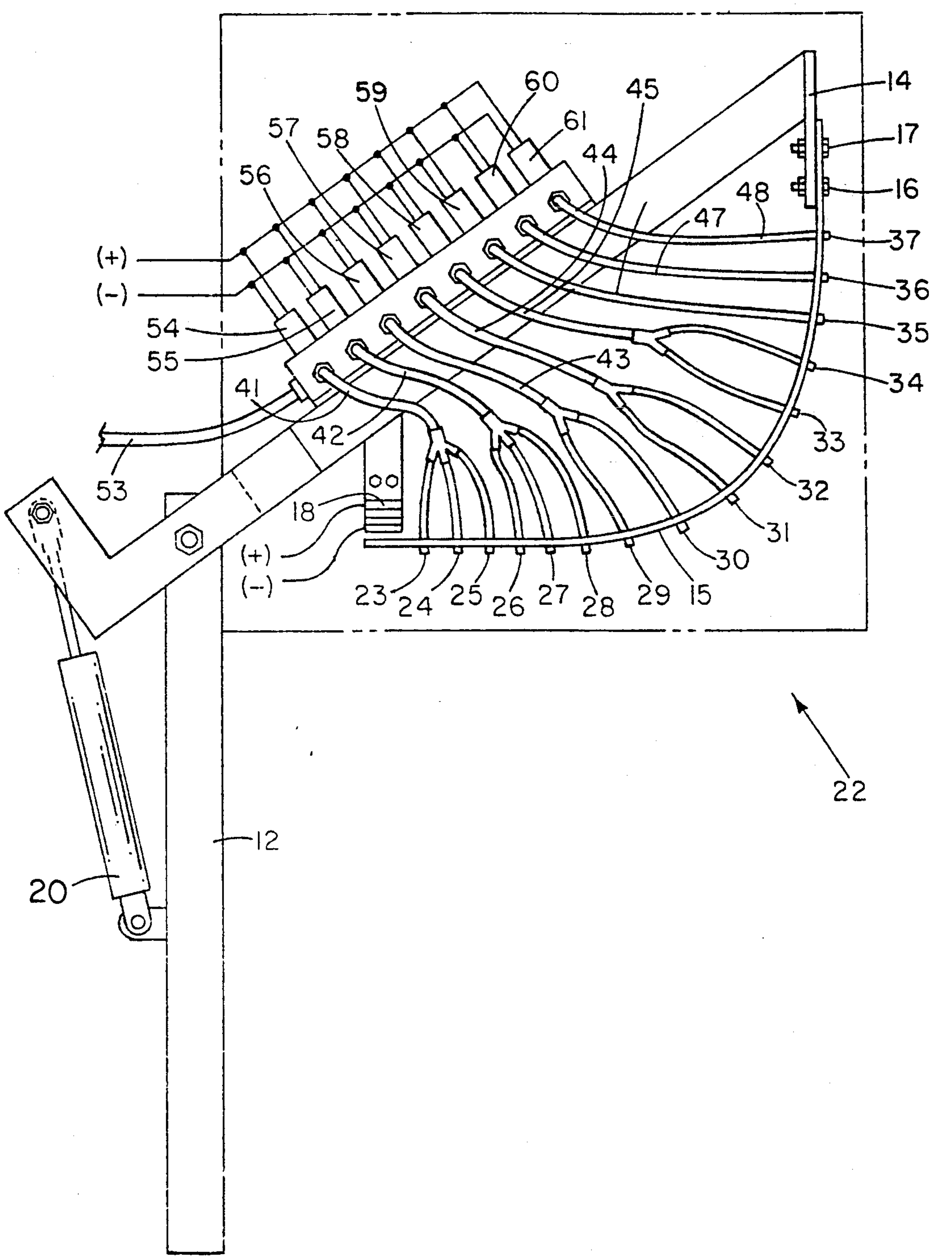
FIG. 2 is a side view of the spray head of the invention.

Referring particularly to FIG. 2, there is shown a side view of the spray apparatus 10 which is mounted on a motor vehicle V as shown in FIG. 1. Spraying apparatus 10 includes a main support beam 11 which is mounted to the front of the vehicle V in a manner such as disclosed in U.S. Pat. No. 4,315,602. A vertical support member 12 is connected with the beam 11. A pivot mechanism including a bifurcated member 13 pivoted to the vertical support 12 and maintained in position by a cylinder means 20 which may be either electric, air, or hydraulic or other remotely controlled power means. The support arm 12 is connected to a spray head 22. Spray head 22 comprises a plurality of nozzles and provides a means for supporting the nozzles. As will be apparent, extension and retraction of the hydraulic cylinder means 14 will cause the spraying means 22 to pivot.

Spray head support 13 is pivotally connected near one end to vertical support member 12. The opposite end of spray head support frame 13 is connected by a bracket 14 to spray arm 15. Arm 15 is made of spring steel and is connected to support bracket 14 by bolts 16 and 17. Spray arm 15 is shaped so that it curves underneath spray head support frame 13 in such a manner that its unconnected end is in close proximity to electromagnet 18 which is secured to the lower underneath portion of spray head support member 13. Spray arm 15 is provided with nozzles 23 through 37 which is turn are connected to flexible hoses 41 through 48. The opposite ends of flexible hoses 41 through 48 are connected to solenoid block 52 which is mounted on top of spray head support frame 13. Solenoid block 52 is fluidly connected to a liquid supply means (not shown) by supply line 53. Solenoid block 52 contains shut off vales 54 through 61 which are connected to flexible hoses 41 through 48. In the present embodiment, the shutoff valves are solenoid operated to control liquid flow to the nozzles. The method of control and operation of the spraying head will be discussed below.

Figure 3:
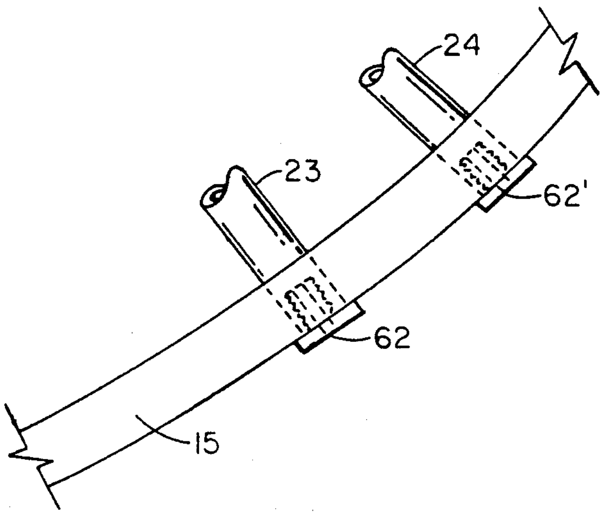
FIG. 3 is a partial view of the spray arm showing the nozzle connection.
Figure 4:
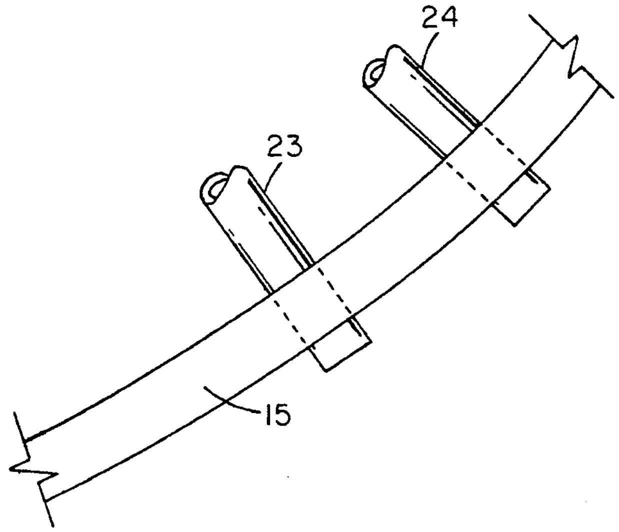
FIG. 4 is a partial view of the spray arm showing an alternative spray means.

Referring to FIGS. 3 and 4, the connection of the hoses and nozzles to spray arm 15 are shown. In FIG. 3 the spray arm 15 is provided with nozzle inserts 62 and 62' to which the flexible hoses are connected. In the embodiment of the FIG. 4, the hoses adhesively mounted in through holes extending through arm 15. The solenoid bank is operatively connected to a chemical delivery control system which allows a vehicle operator to remotely open and close each individual solenoid to produce the desired spray pattern. The specific control system may be any of several such systems utilizing either an analog or microprocessor programmed to control the individual solenoids. The pattern created when all the lines are sprayed collectively is a fan type. Once the desired swaths have been selected by activating the appropriate shutoff valves of solenoid block 52, a mixture of chemicals and water is communicated to the spray nozzles. As the fluid is sprayed, electromagnet 18 is energized by a variable power source. As electromagnet 18 is alternately energized and de-energized, arm 15 is vibrated. That motion causes nozzle vibration which results in the fluid streams breaking up into droplets. However, the nozzles are oscillated in such a manner that the ones which spray closer to the vehicle are moved a greater distance of travel to produce more particulate breakup. Thus, uniform coverage is achieved because laterally adjacent areas extending outward from vehicle "V" are sprayed with increasing droplet sizes which results in less atomization. The nozzles covering the swaths further from the vehicle may also have larger orifice openings than those covering swaths closer to the vehicle which also enables control of the droplet sizes.

Although in this embodiment an electromagnet is used to create the oscillation, one of ordinary skill in the art will recognize that compressed air, hydraulics, electric motor, or some other means may be used, and that variation of the force applied to the arm will make it oscillate at variable speeds.

From the foregoing description and illustrations of this invention, it is apparent that various modifications can be made by rearrangement of the elements or by substitution to produce similar results. It is therefore, the desire of Applicant not to be bound by the description of this invention as contained in this specification but to be bound only by the claims as appended hereto.

I claim:

1. A spraying apparatus for spraying liquids from a moving vehicle comprising:

means on a vehicle for supporting a spray head;

said spray head, including an arm pivotally connected at a first end to said support means, said arm supporting a plurality of spray means for directional spraying;

each of said spray means communicating with a liquid source through a control means;

means operatively connected to a second end of said arm for pivotally vibrating said arm about said first end to distribute liquids in predetermined droplet sizes, with larger droplet sizes covering the furthest swath zones and smaller droplet sizes covering closer swath zones.

2. The apparatus of claim 1 wherein said support means includes means to adjust the angle of inclination of said spray head, said means for adjusting the angle of inclination of said spray head includes remotely controlled power means.

3. The apparatus of claim 1 wherein:

said vibrating means comprises an electromagnet connected to said supporting means for vibrationally pivoting said arm about its pivotal connection to said support means which vibrationally alters the directions of those aerial streams directed toward swaths closer to the spray head in greater amplitude than those directed toward swaths farther from said spray head.

4. The apparatus of claim 3 wherein droplet sizes are determined by the size of the spray orifice in each of said spray means.

5. The apparatus of claim 3 wherein the droplet sizes are determined by the intensity of the vibration of each of said spray means wherein nozzles are straight stream nozzles.

6. The apparatus of claim 3 wherein each of said spray means are mounted on said arm and oriented to collectively spray a predetermined width of swath at a predetermined distance from said vehicle.

* * * * *